J. A. INGRAM & W. P. HATCH.
AUTOMOBILE.
APPLICATION FILED MAR. 4, 1914.
1,249,760.
Patented Dec. 11, 1917.
3 SHEETS—SHEET 1.
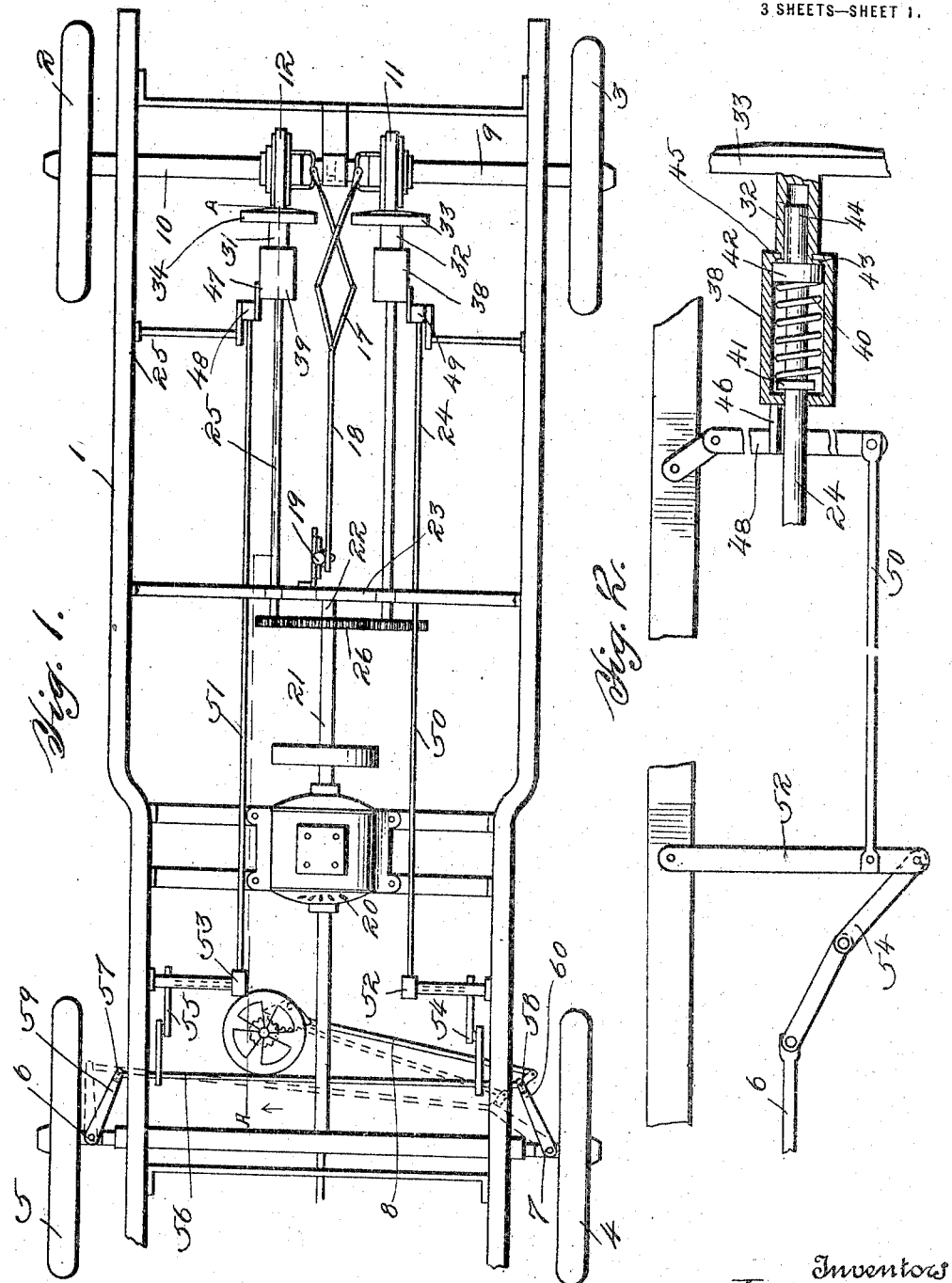
Witnesses
M. P. McKee
G. C. Tracy
Inventors
J. A. Ingram
W. P. Hatch
Alex J. Wedderburn, Jr.
Attorney J. A. INGRAM & W. P. HATCH.
AUTOMOBILE.
APPLICATION FILED MAR. 4, 1914.
1,249,760.
Patented Dec. 11, 1917.
3 SHEETS—SHEET 2.
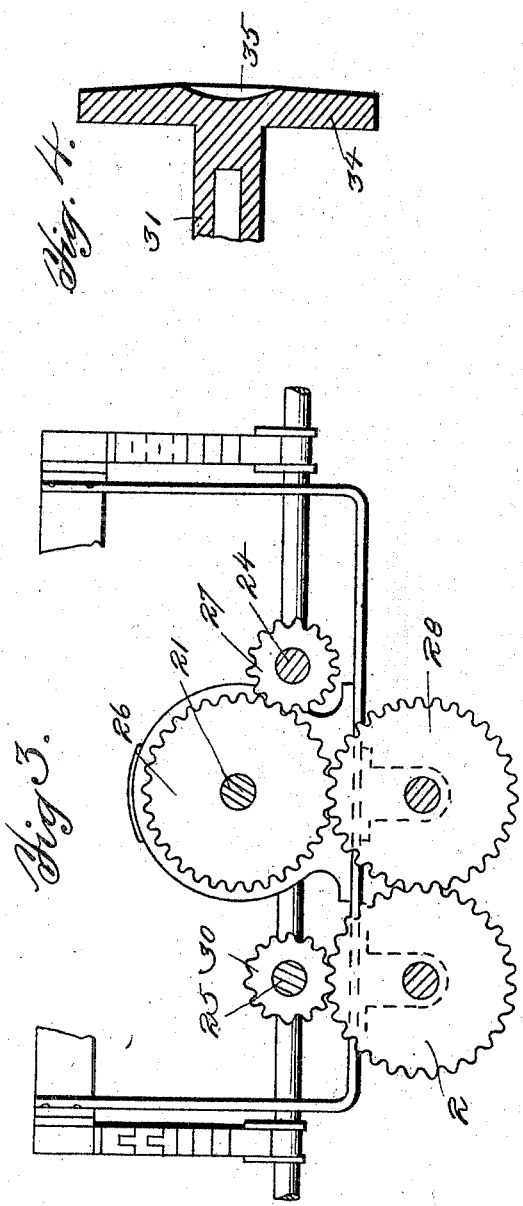
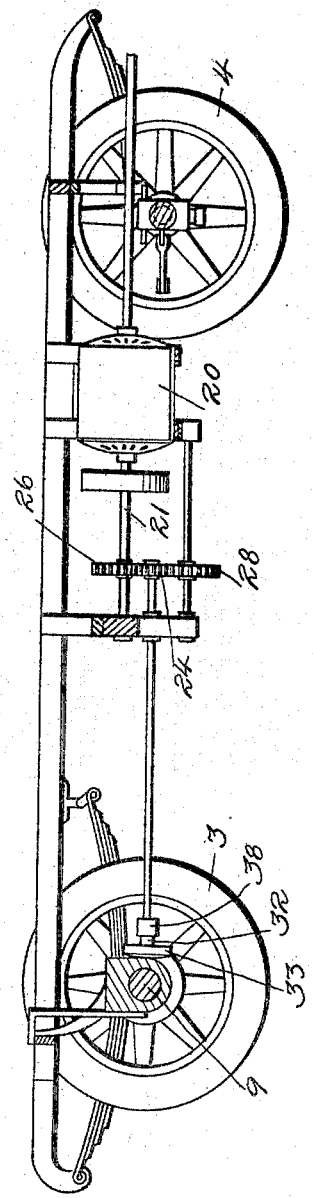
Witnesses
M. P. McKee
G. A. Tracy
Inventors
J. A. Ingram
W. P. Hatch
Alex. J. Wedderburn Jr.
Attorney

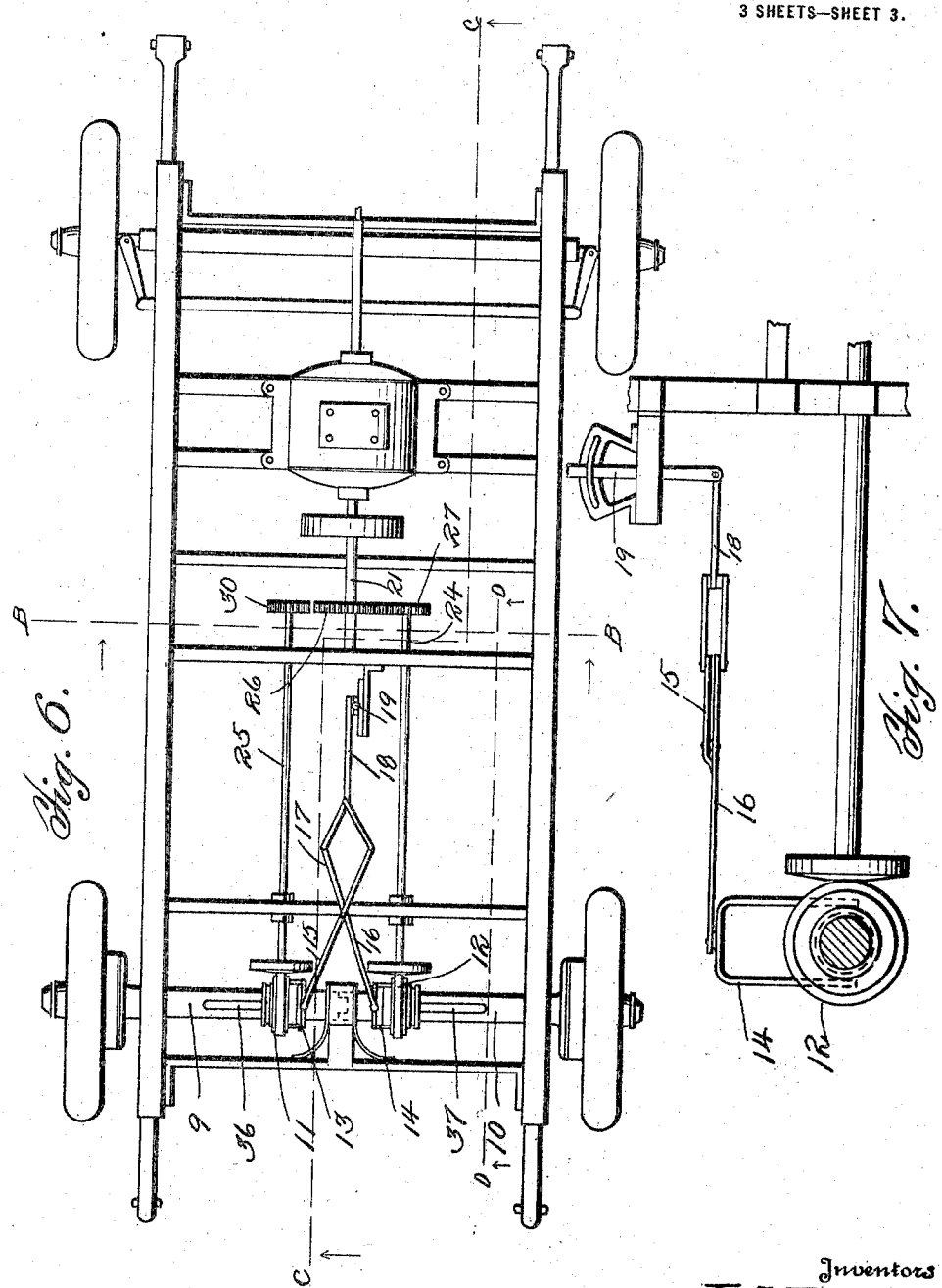

UNITED STATES PATENT OFFICE.

JOSEPH A. INGRAM AND WALTER P. HATCH, OF NEW YORK, N. Y., ASSIGNORS TO INGRAM HATCH MOTOR CORPORATION, OF NEW YORK, N. Y.

AUTOMOBILE.

1,249,760. Specification of Letters Patent. Patented Dec. 11, 1917.

Application filed March 4, 1914. Serial No. 822,353.

*To all whom it may concern:*

Be it known that we, JOSEPH A. INGRAM and WALTER P. HATCH, citizens of the United States, residing at New York, in the county of New York and State of New York, have invented certain new and useful Improvements in Automobiles, of which the following is a specification.

This invention relates to improvements in automobiles and has for its object to provide an improved drive mechanism.

Another object of the invention is to provide a friction drive mechanism and control therefor.

Another object of the invention is to provide a lever controlled starting mechanism for automobiles.

Another object of the invention is to provide a lever controlled variable speed friction gear for automobiles, etc.

Still another object of the invention is to provide automatic means for disengaging the driving mechanism of an automobile from one or the other of the drive wheels as the machine takes a curve.

With the above and other objects in view which will hereinafter appear and be fully described, we have invented the device illustrated in the accompanying drawings in which—

Figure 1 is a top plan view of a chassis embodying our invention,

Fig. 2 is a longitudinal sectional elevation on line A—A of Fig. 1,

Fig. 3 is a section on line B—B of Fig. 6 partly broken away,

Fig. 4 is an enlarged detail sectional view of a friction disk,

Fig. 5 is a section on line C—C of Fig. 1,

Fig. 6 is another top plan view of the device one part of the invention being eliminated and Fig. 7 is an enlarged detail view taken on line D—D of Fig. 6.

Like reference characters indicate like parts throughout the specification and in the several views in the drawings in which 1 indicates an automobile chassis mounted upon rear wheels 2 and 3 and the forward wheels 4 and 5 which are connected through their knuckles 6 and 7 and the steering rod 8.

The wheels 2 and 3 are mounted on axle shafts 9 and 10 upon the inner parts of which are slidably mounted rotatably fixed friction gears 11 and 12 swiveled to carriers 13 and 14 to which are pivotally connected arms 15 and 16 of the toggle 17 which is operated by a horizontally movable toggle operator 18 connected to a vertically disposed shifting lever 19.

Mounted upon the forward part of the chassis 1 is an engine 20 having a shaft 21 the end 22 of which is mounted in the member 23 which also forms a bearing for the shafts 24 and 25. The shaft 21 is provided with a gear wheel 26 which operates the gear 27 mounted on the shaft 24 and also the transmission gears 28 and 29 which in turn drive the gear 30 on the shaft. On the outer ends of the shafts 24 and 25 are collars 31 and 32 which rotate with the shafts upon which they are mounted. Fixedly mounted on these collars are bevel faced friction disks 33 and 34 the bevel faces of which are adapted to frictionally engage and rotate the gears 11 and 12. The central portions of the disks 33 and 34 are dished to form recesses 35 which when opposing the edges of the gears 11 and 12 prevent contact between the gears 11 and 12, 33 and 34 whereby the gears 33 and 34 may freely rotate without transmitting movement to said gears 11 and 12. The axle members 9 and 10 are provided with longitudinal slots 36 and 37 in which feathers (not shown) on the disks 11 and 12 are slidable whereby said members 11 and 12 may be moved longitudinally of the shafts 9 and 10, but may not rotate without rotating said shafts. The operation of the lever 19 in one direction or another will cause the toggle member 17 to slide said gears 11 and 12 longitudinally of said axles 9 and 10 in order to cause the edges of said gears to oppose different portions of the beveled faces of said gears 33 and 34, whereby the speed of said gears 11 and 12 may be varied or the movement thereof discontinued altogether.

The collars 31 and 32 have enlargements 38 and 39 in which spiral springs 40 encompass the shafts 24 and 25, one end of said springs engaging the flanges 41 of said shafts and the other ends engaging collars 42 slidably mounted on said shafts, said collars 42 abutting the shoulders 43 on the collars 31 and 32 whereby the latter collars and the gears thereon are normally forced toward the gears 11 and 12. Feather connections 44 between the shafts 24 and 25 on the collars 31 and 32 are provided in order to permit a sliding movement of said collars on said shafts while locking said collars 31 and 32 and said shafts in rotatable connection. The enlargements 38 and 39 are swiveled to the portions 31 and 32 as indicated at 45 whereby the portions 31 and 32 may be freely rotated with the shafts 24 and 25 while said enlargements 38 and 39 are held against rotation by means of the links 46 and 47 which are fixed thereto. The other ends of these links are fixed to the levers 48 and 49 which in turn are connected to the operating rods 50 and 51. The forward ends of these latter rods are connected to levers 52 and 53 which are operated by links 54 and 55 connected to a rod 56 the opposing ends of which are pivoted at 57 and 58 to the free ends of the levers 59 and 60 which operate the knuckles 6 and 7. By means of this arrangement the turning of the wheels 4 and 5 outwardly will draw the rod 50 or 51 forward to such an extent that the gear 33 or 34 is drawn out of contact with its coöperating gear 11 or 12 whereby the rotation of the axle shafts 9 and 10 on the side to which the car is turning will not be rotated until the car begins to go straight ahead again when the gear 33 or 34 will be thrust back against its coöperating gear 11 or 12. This driving mechanism is so extremely simple that comparatively very few parts are required and the car may be readily controlled with a single lever, thus greatly simplifying the construction and operation of an automobile.

Having now described our invention, that which we claim to be new and desire to procure by Letters Patent is:

1. In a device of the kind described, in combination, a two section drive shaft upon which vehicle drive wheels are directly mounted, a steering device, a pair of drive gears mounted one on each of said drive shaft sections, a pair of gears engageable with said first-named gears at right angles, shafts upon which said last-named gears are fixed, members sliding on said last-named shafts, springs carried by said last-named shafts pressing against said drive gears to cause them to rotate said first-named gears, said members engaging said springs to disengage them, and means for actuating said members, said means controlled by said steering device.

2. In a device of the kind described, in combination, two longitudinal shafts, a drive gear slidable on each of said shafts, driven gears arranged to be engaged by said drive gears, springs arranged to exert pressure against said drive gears, means connected to said longitudinal shafts arranged to hold said spring, a pair of steering wheels, means engaging said spring whereby to disengage them, and means controlled by said wheels for operating said last-named means.

3. In a device of the kind described, in combination, two longitudinal shafts, drive gears mounted on said shafts, driven gears connected to said drive gears, means for rotating said shafts in common, a collar formed on each of said shafts, a spring coiled around said shafts and bearing against said collars at one end, slidable members on said shafts, rotating therewith and connected to said drive gears, said spring engaging said members to force said drive gears against said driven gears, and means to disengage either spring.

4. In a device of the kind described, in combination, two shafts arranged at right angles to each other, a drive and driven gear mounted on said shafts respectively, a collar slidable on one of said shafts and carrying said drive gear, a spring-holding member surrounding said drive shaft, and being slidable thereon, said collar rotating with said drive shaft, a fixed collar on said shaft in said member, a spring engaging said collar to press said drive gear against said driven gear, said member arranged to disengage said spring when actuated, and means for actuating said member.

5. In combination a driven shaft, a driven gear thereon, a drive shaft at right angles to said driven shaft, a drive gear, a collar slidably rotating with said drive shaft, said drive gear being connected to said collar, a spring holding enlargement surrounding the drive shaft, a collar fixed on said drive shaft against which said spring bears, a movable collar on said drive shaft against which said spring presses, said first-named collar and second-named collar interengaging, said member designed to engage said second named collar whereby to disengage said collars, and means for actuating said member.

6. In a device as described, in combination, a shaft, a spring-holding member slidable thereon, a collar fixed on said shaft, a spring coiled around said shaft and bearing against said collar at one end, a drive gear, means engaged by said spring and engaging said gear, a driven gear engaged by said drive gear, a lever, a link connecting said lever and said member whereby said member may be slid, and means for actuating said lever.

7. The described device embracing a two section axle, a driven gear on each section, a pair of drive shafts, gears rotatable therewith for driving said first gears and slidably mounted on their respective shafts, said last gears being spring pressed, housings for said springs, said housings being slidable on said drive shafts, and adapted to operate said drive gears against the action of said springs, means for operating said housings, and a pair of steering wheels and means whereby said wheels may operate said housings.

8. The described device embracing a two section axle, a driven gear on each section, a pair of drive shafts, gears rotatable therewith for driving said first gears and slidably mounted on their respective shafts, said last gears being spring pressed, housings for said springs, said housings being slidable on said drive shafts, and adapted to operate said drive gears against the action of said springs, means for operating said housings, a pair of steering wheels and means whereby said wheels may operate said housings, said housings and gears connected therewith being independently operable.

9. The described device embracing a two section axle, a driven gear on each section, a pair of drive shafts, gears rotatable therewith for driving said first gears and slidably mounted on their respective shafts, said last gears being spring pressed, housings for said springs, said housings being slidable on said drive shafts, and adapted to operate said drive gears against the action of said springs, means for operating said housings, a pair of steering wheels and means whereby said wheels may operate said housings, said housings and gears connected therewith being independently operable whereby the movement of said wheels in one direction will actuate one of said housings.

10. The described device embracing a two section axle, a driven gear on each section, a pair of drive shafts, gears rotatable therewith for driving said first gears and slidably mounted on their respective shafts, said last gears being spring pressed, housings for said springs, said housings being slidable on said drive shafts, and adapted to operate said drive gears against the action of said springs, means for operating said housings, a pair of steering wheels and means whereby said wheels may operate said housings, said housings and gears connected therewith being independently operable whereby the movement of said wheels in one direction will actuate one of said housings, and the movement of said wheels in another direction will actuate the other housing.

11. In a vehicle, independently driven axles, independent driving means therefor, independent controlling means for the axles, means whereby the steering wheels of the vehicle control said last means, said driving means consisting of rotatable disks, said disks being spring controlled.

12. In a vehicle, independently driven axles, independent driving means therefor, independent controlling means for the axles, means whereby the steering wheels of the vehicle control said last means, said driving means consisting of rotatable disks, said disks being spring controlled, and housings for said springs, said last means operating said housings.

13. In a vehicle, independently driven axles, independent driving means therefor, independent controlling means for the axles, means whereby the steering wheels of the vehicle control said last means, said driving means consisting of rotatable disks, said disks being spring controlled, housings for said springs, said last means operating said housings to control said disks.

14. In a vehicle, independently driven axles, independent driving means therefor, independent controlling means for the axles, means whereby the steering wheels of the vehicle control said last means, said driving means consisting of rotatable disks, said disks being spring controlled, housings for said springs, said last means operating said housings to control said disks, and friction gears on said axles operated by said disks.

15. In a vehicle, independently driven axles, independent driving means therefor, independent controlling means for the axles, means whereby the steering wheels of the vehicle control said last means, said driving means consisting of rotatable disks, said disks being spring controlled, housings for said springs, said last means operating said housings to control said disks, friction gears on said axles operated by said disks, said gears being slidable on said axles.

16. In a vehicle, independently driven axles, independent driving means therefor, independent controlling means for the axles, means whereby the steering wheels of the vehicle control said last means, said driving means consisting of rotatable disks, said disks being spring controlled, housings for said springs, said last means operating said housings to control said disks, friction gears on said axles operated by said disks, said gears being slidable on said axles, and means for simultaneously operating said gears.

17. In a vehicle, independently driven axles, independent driving means therefor, independent controlling means for the axles, means whereby the steering wheels of the vehicle control said last means, said driving means consisting of rotatable disks, said disks being spring controlled, housings for said springs, said last means operating said housings to control said disks, friction gears on said axles operated by said disks, said gears being slidable on said axles, means for simultaneously operating said gears, said means consisting of a lazy tong having arms connecting with each gear.

18. In a vehicle, a pair of rotatable rear axles, friction wheels thereon, friction disks for rotating the same and means whereby the steering wheels of the vehicle connect and disconnect said disks from the friction wheels, driven shafts upon which disks are mounted, and slidable collars on said shafts, said means being connected with said collars.

19. In a vehicle, a pair of rotatable rear axles, friction wheels thereon, friction disks for rotating the same and means whereby the steering wheels of the vehicle connect and disconnect said disks from the friction wheels, driven shafts upon which disks are mounted, and slidable collars on said shafts, said means being connected with said collars, the drive wheels of the vehicle being fixedly mounted upon said axles.

20. In a vehicle, a pair of rotatable rear axles, friction wheels thereon, friction disks for rotating the same and means whereby the steering wheels of the vehicle connect and disconnect said disks from the friction wheels, said means consisting of a series of pivotally connected levers and links.

In testimony whereof we affix our signatures in presence of two witnesses.

JOSEPH A. INGRAM.
WALTER P. HATCH.

Witnesses:
  FRANK WAASER,
  BJAME IVERSEN.

Copies of this patent may be obtained for five cents each, by addressing the "Commissioner of Patents, Washington, D. C."